Oct. 4, 1955          R. P. ALEX          2,719,593
COMBINED ANTI-FLAPPING AND DROOP STOP
Filed March 5, 1953
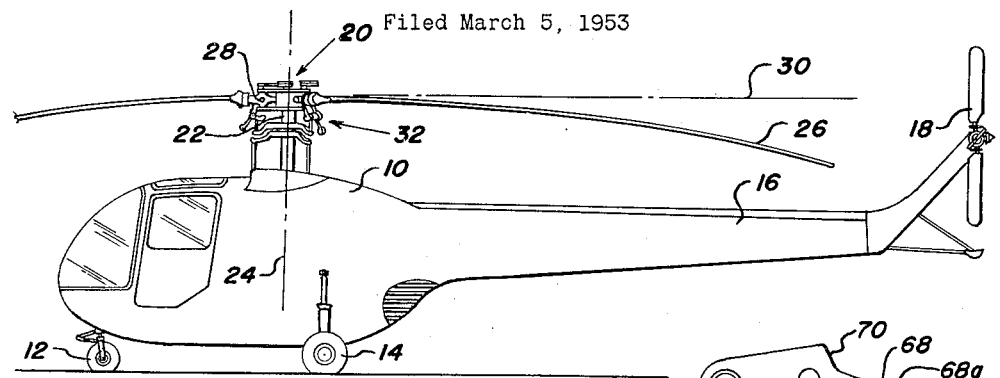
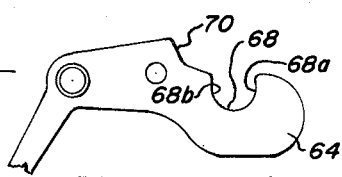
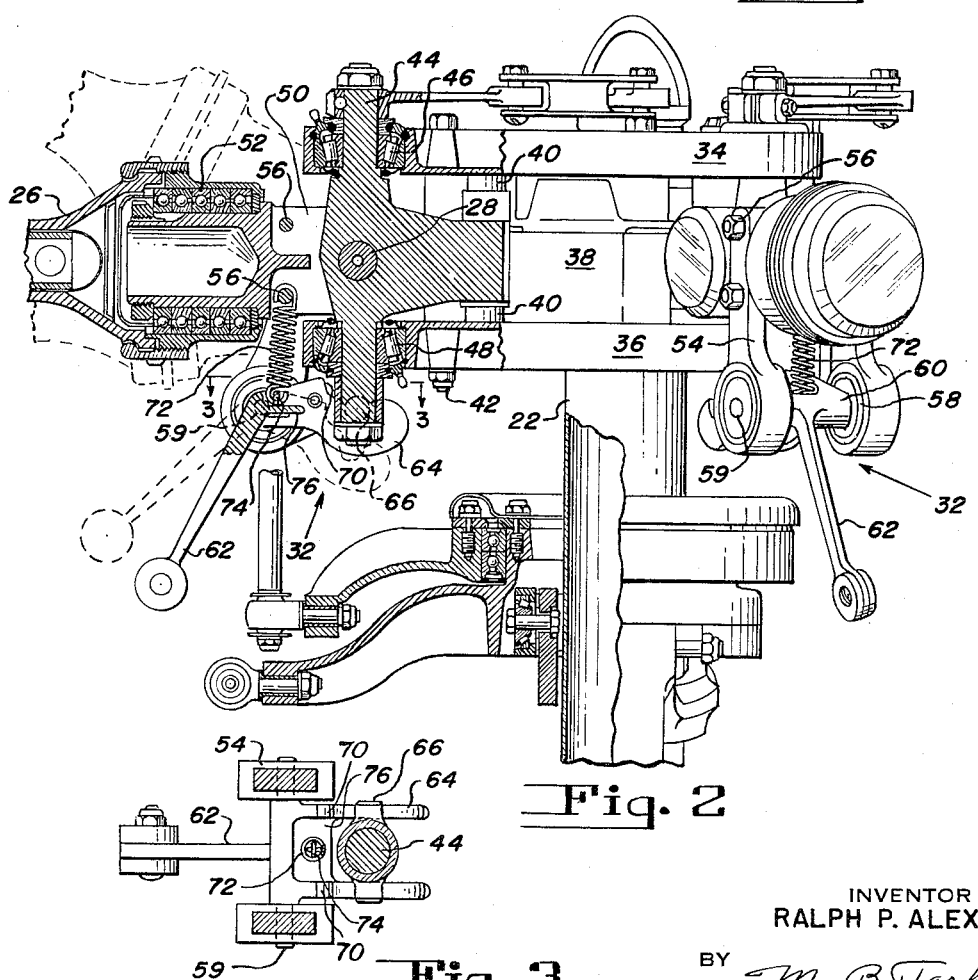
INVENTOR
RALPH P. ALEX
BY *M. B. Tasker*
ATTORNEY United States Patent Office 2,719,593
Patented Oct. 4, 1955

2,719,593

COMBINED ANTI-FLAPPING AND DROOP STOP

Ralph P. Alex, Fairfield, Conn., assignor to United Aircraft Corporation, East Hartford, Conn., a corporation of Delaware Application March 5, 1953, Serial No. 340,469

9 Claims. (Cl. 170—160.55)

This invention relates to helicopters of the type having flapping rotor blades.

When a helicopter of this type is on the ground and its rotor blades are stationary or rotating only slowly, the blades are susceptible to damage by a gust of wind which may flap a blade upwardly and allow it to drop violently, resulting in damage to the blade or its mounting, or a gust may deflect a slowly rotating blade downwardly sufficiently to strike the fuselage of the ship and damage both the blade and the ship. Under these conditions when the centrifugal forces acting on the blades are zero or are very low, it is desired to restrain the blades from flapping due to gusts. When, however, the blades are rotating above a predetermined safe R. P. M. at which the centrifugal forces acting on the blades straighten them so that gusts cannot deflect them dangerously out of their normal path of rotation, it is desired to release the flapping lock on the blades and permit them to flap as they are intended to do in normal flight.

It is an object of this invention to provide improved means for restraining the rotor blades of a helicopter from flapping when the rotor is stationary or the blades are rotating slowly while automatically releasing the blades for flapping movement under normal flight conditions.

A further object of the invention is to provide a flapping lock for a helicopter blade which moves bodily with the blade as the latter moves about its flapping hinge.

A further object of the invention is to provide an improved flapping restraining mechanism for helicopter rotor blades which automatically releases the blades at a predetermined rotor R. P. M. and which is extremely simple in construction and reliable in operation.

A further object of this invention is to provide droop stop mechanism for limiting the downward movement of the rotor blades of a helicopter about their flapping hinges when the rotor is stationary or rotating slowly but which will permit a greater degree of downward flapping movement when the blades are rotating at higher speeds in flight.

A further object of the invention is to provide a combined anti-flapping and droop stop mechanism for helicopter rotor blades.

These and other objects of the invention will be evident from the following specification and from the accompanying drawings which illustrate a helicopter of the type having a plurality of blades each of which is pivotally mounted for individual flapping movement.

In these drawings:

Fig. 1 is a side elevation of a helicopter equipped with the improved anti-flapping and droop stop mechanism, the rotor blades being shown in the drooped position which they occupy when at rest;

Fig. 2 is an enlarged detail view of one of the blade mountings illustrating the two positions of the mechanism for controlling the flapping of the blades;

Fig. 3 is a detailed view taken on line 3—3 of Fig. 2, and

Fig. 4 is an enlarged detail showing the multiple latch faces on the improved latching member.

As shown in Fig. 1, the helicopter includes a fuselage 10 which is supported on the ground on nose wheels 12 and rear wheels 14. The fuselage includes a tail cone 16 at the outboard extremity of which a tail rotor 18 is supported for rotation about a generally horizontal axis. The main rotor generally indicated at 20 is rotatable about a generally upright rotor drive shaft 22 the axis of rotation 24 of which is normally vertical. The rotor blades 26 are pivotally connected to the rotor head for movement about a flapping hinge 28 so that in normal flight when the R. P. M. of the rotor is high these blades will cone upwardly above the reference line 30 which is perpendicular to the rotor axis 24.

When the helicopter is on the ground and the rotor is stationary or is rotating slowly the blades 26 are subject to damage from gusts of wind which may whip the blades upwardly and allow them to drop suddenly with destructive force. In accordance with the present invention restraining means generally indicated at 32 is provided for each blade of the rotor which operates automatically in response to changes in R. P. M. of the rotor to permit the blades to flap upwardly in flight when the speed of the rotor is sufficient to generate blade protecting centrifugal forces but which locks the blades against such upward flapping when they are stationary or rotating too slowly to produce these protective forces. Since the locking mechanism associated with the several blades are identical only one will be described in detail herein.

The rotor head is mounted on the upper end of the drive shaft 22 and as shown in Fig. 2 includes parallel upper and lower plates 34 and 36 which are spaced apart on shaft 22 by a hub 38 which is fixed to the shaft by a key (not shown). The hub has upper and lower flanges 40 and bolts 42 extend through these flanges and the upper and lower plates to secure the latter in fixed parallel relation on shaft 22 and at right angles thereto.

The rotor blades are supported in spaced relation about the periphery of the plates 34 and 36, the helicopter shown herein being of the type having three rotor blades. The pivotal mounting of one of these blades is shown in detail in Fig. 2 in which a generally vertical drag hinge 44 is shown journalled in the upper and lower plates 34 and 36 on bearings 46 and 48. This hinge permits a limited freedom of movement of the blade in the plane of its rotation, suitable limit stops (not shown) being provided to control this movement in a well known manner. For a disclosure of drag hinge stops reference is made to Patent No. 2,629,452, issued February 24, 1953, to R. P. Alex and assigned to the assignee of this application.

The flapping hinge 28 intersects the axis of the drag hinge 44 and supports the flapping link 50 on which the blade 26 is mounted on bearings 52 for rotation about its longitudinal axis for pitch change in a usual manner. The flap restraining mechanism 32 is designed to hold the flapping link 50 and the root of the blade substantially in the plane of reference line 30 when the helicopter is on the ground, and to release the blade for nominal flapping movement above or below the plane of line 30 whenever the helicopter is in flight or the blades are rotating at a sufficiently high R. P. M. to produce sufficient centrifugal force to safeguard the blades.

Referring to Fig. 2 it will be noted that the flapping link 50 carries a pair of parallel depending arms 54 which are rigidly attached to the flapping link by upper and lower through bolts 56. The depending ends of arms 56 are enlarged to receive anti-friction bearings 58 in which a pendulum type latch member 60 is journalled for swinging movement about trunnion-like pivots 59, the latch member being located between the arms 54 as shown in the right hand side of Fig. 2.

The latch member 60 comprises a depending pendulum arm 62 having a weight at its lower extremity and a generally horizontally latch 64 which engages a latch pin 66 carried by the lower end of the drag hinge 44 and projecting on opposite sides of the lower cylindrical end thereof which projects below the bearing 48. From Fig. 3 it will be noted that the latch 64 is bifurcated to straddle the lower cylindrical end of the drag hinge 44. As shown in Fig. 4, the latching face of latch 64 comprises a generally semi-circular latch pin engaging face 68 which merges into an abutment face 70 the purpose of which will be hereinafter explained. The latch member 60 is free to move about its pivots 59 between the full line position of Fig. 2 in which the latch face 68 engages the latch pin 66 and a dotted line position in which the pin is free from the latch face 68 as the depending arm 62 of the latch member 60 is swung outward by centrifugal force acting on the weighted end thereof. Normally, however, the latch member 60 is biased by a tension spring 72 into the full line position of Fig. 2. This spring is attached at its upper end to the lowermost through bolt 56 and at its lower end to the eye 74 which is fixed in a web 76 between the furcations of latch member 64. It will be noted that the point of attachment of the eye 74 is slightly to the right of the axis of pivots 59 so that a constant force is exerted by the spring tending to engage latch member 64 and pin 66, the engagement of the portion 68a of latch face 68 with pin 66 locking the blades against upward flapping movement.

Also due to their great length the blades of helicopter rotors droop downwardly under their own weight when they are not rotating or when they are rotating very slowly as is shown in Fig. 1. In this drooped position of the blades the tips of the blades must be sufficiently high to permit the rotor to be started without danger of interference of the blade tips with the tail cone of the helicopter. It is common practice to provide a stop to limit the downward movement of the blades about their flapping hinges under these conditions to provide a safe clearance between the tips of the blades and the fuselage body when the rotor is stationary or during the initial acceleration thereof.

During certain flight conditions, however, the blades may flap through such wide angles about their flapping hinges that they will bump against these stops which subjects the blades to severe bending moments. Under these flight conditions it would be better if the stops were not present since at the higher rotor speeds the aerodynamic lift on the blades and the centrifugal force acting spanwise of the blades straightens the blades so that they do not have the droop which is present when the rotor is stationary.

In accordance with this invention the same anti-flapping lock above described also provides droop stop means for automatically limiting the downward flapping of the blades below the plane of reference line 30 when member 60 is in the full line position of Fig. 2 by engagement between pin 66 and abutment portion 68b of latch face 68; and further provides for permitting the blades to flap below this plane when member 60 is in the dotted line position corresponding to a high R. P. M. of the blades. When the latch member 60 occupies the dotted line position in flight, the abutment surface 70 previously mentioned provides a limit stop for the downward flapping of the blades in their then straightened position, it being noted that when this generally vertical abutment face 70 engages the latch pin 66 under these conditions a line drawn perpendicular to the abutment face 70 extends through the latch pin 66 and the axis of pivots 59 of the latch member thus providing a solid abutment which prevents the blades from flapping below a safe position.

It will be evident that as a result of this invention a combined anti-flapping and droop stop for the blades of a rotor has been provided by which the blades are permitted to flap a greater angle in flight when the lift on the blades and the centrifugal forces acting thereon hold the blades in straightened or upwardly deflected position, while limiting the downward flapping of the blades below the horizontal position thereof when the rotor is stationary or rotating so slowly that the blade tips droop.

It will also be evident that this improved mechanism functions to control the upward flapping of the blades when the helicopter is standing on the ground so that both anti-flapping and droop stop protection is provided by a very simple and reliable mechanism.

It will be noted that in the construction of this invention the flyball operated latch member is carried by the blade supporting flapping link which in itself is located outboard of the drag hinge. As a result of this construction the flyball operated latch member is subjected to higher centrifugal forces. Due to this and the fact that the latch member is carried by a member which itself flaps with the blade, a greater reliability in operation results.

While only one embodiment of the invention has been shown and described herein, it will be evident that various changes may be made in the construction and arrangement of the parts without departing from the scope of the invention.

I claim:

1. A combined anti-flapping and droop stop mechanism for rotary wing aircraft of the type having a rotor hub, a drag hinge journaled in said hub, an outboard flapping link pivotally mounted on said drag hinge and a rotor blade having its root end carried by said flapping link, said mechanism including a centrifugally operated latch member pivotally mounted on said flapping link and a cooperating latch engaging member carried by said drag hinge, said latch member having a latch face which cooperates with said latch engaging member to lock said flapping link and blade against flapping movement whenever said rotor is stationary or rotating below a predetermined R. P. M., and an abutment which engages said latch engaging member only when said rotor is rotating above said predetermined R. P. M.

2. A combined anti-flapping and droop stop mechanism for rotary wing aircraft of the type having a rotor hub, a drag hinge journaled in said hub, an outboard flapping link pivotally mounted on said drag hinge and a rotor blade having its root end carried by said flapping link, said mechanism including a centrifugally operated latch member pivotally mounted on said flapping link which extends in an inboard direction beyond said pivot and a cooperating latch engaging member carried by said drag hinge, said latch member having a latch face which cooperates with said latch engaging member to lock said flapping link and blade against flapping movement below the normal latched position of said mechanism whenever said rotor is stationary or rotating below a predetermined R. P. M. and an abutment farther outboard on such latch member than said latch face which engages said latch engaging member at a lower flapped position of said link and blade only when said rotor is rotating above said predetermined R. P. M. and said latch member has swung outwardly about its pivot under the influence of centrifugal force.

3. A combined anti-flapping and droop stop mechanism for rotary wing aircraft of the type having a rotor hub, a drag hinge journaled in said hub, an outboard flapping link pivotally mounted on said drag hinge and a rotor blade having its root end carried by said flapping link, said mechanism including a centrifugally operated latch member pivotally mounted on said flapping link and a cooperating latch engaging member carried by said drag hinge, said latch member having a portion extending inboard from its pivot including an anti-flapping latch face which engages with said latch engaging member when said rotor is stationary or rotating below a predetermined R. P. M. and an abutment adjacent said latch face for arresting the downward flapping movement of said blade and link when said rotor is rotating above said predetermined R. P. M.

4. A combined anti-flapping and droop stop mechanism for rotary wing aircraft of the type having a rotor hub, a drag hinge journalled in said hub, an outboard flapping link pivotally mounted on said drag hinge and a rotor blade having its root end carried by said flapping link, said mechanism including a centrifugally operated latch member pivotally mounted on said flapping link and a cooperating latch engaging member carried by said drag hinge, said latch member having a portion extending inboard from its pivot including an anti-flapping latch face which engages with said latch engaging member when said rotor is stationary or rotating below a predetermined R. P. M. and an abutment farther outboard on said latch member than said anti-flapping latch face for arresting the downward flapping movement of said blade and link when said rotor is rotating above said predetermined R. P. M., and means for normally biasing said latch member into position to engage said latch engaging member by said anti-flapping latch face whenever said rotor is rotating below said R. P. M.

5. Anti-flapping and droop stop mechanism for rotary wing aircraft of the type having a rotor hub rotated by a drive shaft, and a blade mounted on said hub for flapping movement, said mechanism including a drag hinge journalled in said hub, a flapping link pivotally mounted on said drag hinge and supporting the blade outboard thereof, a pendulum type latch member pivotally mounted on said flapping link having a depending pendulum arm and an angularly related latch arm, the pivot of said latch member being transverse to the axis of said shaft so that said pendulum arm is swung outwardly from the axis of rotation of the rotor shaft by centrifugal force, a latch engaging member on said hub engageable by said latch arm whenever said rotor is at rest or is rotating below a predetermined R. P. M. for locking said blade against flapping movement, and means for biasing said latch member toward latching position, said latch arm also having an abutment face engageable with said latch engaging member when said pendulum arm is swung outwardly by centrifugal force for limiting the downward flapping movement of said blade.

6. Combined anti-flapping and droop stop mechanism for controlling the flapping of the rotor blade of a rotary wing aircraft of the type having a rotor hub driven by a drive shaft and a blade mounted on said hub for flapping movement, said mechanism comprising a pendulum arm pivoted to the blade adjacent the root of the blade for flapping movement therewith, the pivot for said arm being transverse to the axis of said drive shaft so that said arm is swung outwardly from said axis by centrifugal force when said shaft is rotating above a predetermined R. P. M., and cooperating latch and latch engaging members, one carried by said arm and the other by said hub, for limiting the flapping movement of said blade, said latch member having two faces alternately engageable with said latch engaging member in different positions of said arm providing different limits of flapping movement for said blade when said shaft is rotating slowly and when it is rotating above said predetermined R. P. M.

7. Combined anti-flapping and droop stop mechanism for controlling the flapping of the rotor blade of a rotary wing aircraft of the type having a rotor hub driven by a drive shaft and a blade mounted on said hub for flapping movement, said mechanism comprising a pendulum arm pivoted to the blade adjacent the root of the blade for flapping movement therewith, the pivot for said arm being transverse to the axis of said drive shaft so that said arm is swung outwardly from said axis by centrifugal force when said shaft is rotating above a predetermined R. P. M., and cooperating latch and latch engaging members, one carried by said arm and the other by said hub, for limiting the flapping movement of said blade, said latch member having two faces, one engageable by said latch engaging member in one position of said arm and the other engageable by said latch engaging member in another position of said arm as the latter moves about its pivot under the action of centrifugal force from a position adjacent the axis of said shaft to a position remote therefrom.

8. Combined anti-flapping and droop stop mechanism for the blades of rotary wing aircraft of the type having a rotor comprising a hub and rotor blades mounted on said hub for flapping movement, said mechanism including a centrifugally operated latch member for each blade pivotally mounted on a flapping part of the blade structure and a cooperating latch engaging member on said hub, said latch member having a latch face which engages said latch engaging member in the normal position of said blade when the rotor is stationary or is rotating below a predetermined R. P. M. and holds the blade against flapping and an abutment face which is engageable by said latch engaging member and limits the downward flapping movement of said blade when said rotor is rotating above said predetermined R. P. M. and said blade is free to flap.

9. In a rotary wing aircraft having a hub and a blade mounted on said hub for flapping movement, a centrifugally operated latch member carried by a flapping part of said blade having a latch face and an abutment spaced from said latch face, and a cooperating member carried by said hub for engaging said latch face for locking said blade against flapping above or below a normal latched position of said blade and engageable with said abutment only when said rotor is rotating above a predetermined R. P. M. and it is safe for said blade to flap downwardly to a position below said normal latched position.

References Cited in the file of this patent

UNITED STATES PATENTS

| 2,151,215 | Larsen | Mar. 21, 1939 |
| 2,549,887 | Buivid | Apr. 24, 1951 |
| 2,614,640 | Buivid | Oct. 21, 1952 |

FOREIGN PATENTS

| 64,262 | Netherlands | Oct. 15, 1949 |